United States Patent [19]

Negus

[11] Patent Number: 5,150,364
[45] Date of Patent: Sep. 22, 1992

[54] INTERLEAVED TIME-DIVISION DEMULTIPLEXOR

[75] Inventor: Kevin J. Negus, San Jose, Calif.

[73] Assignee: Hewlett-Packard Company, Palo Alto, Calif.

[21] Appl. No.: 573,550

[22] Filed: Aug. 24, 1990

[51] Int. Cl.[5] ............................................. H04J 3/04
[52] U.S. Cl. .................................. 370/112; 307/244; 328/62; 328/105
[58] Field of Search .................. 370/112, 244; 328/62, 328/105

[56] References Cited

U.S. PATENT DOCUMENTS

| | | | |
|---|---|---|---|
| 3,995,119 | 11/1976 | Pachynski, Jr. | 179/15 AF |
| 4,104,950 | 8/1978 | Finley | 84/462 |
| 4,672,647 | 6/1987 | Yamaguchi et al. | 377/77 |
| 4,697,279 | 9/1987 | Baratti et al. | 377/73 |
| 4,703,471 | 10/1987 | Fitelson et al. | 370/1 |
| 4,791,628 | 12/1988 | Swartz | 370/112 |
| 4,835,768 | 5/1989 | Hubbard et al. | 370/106 |
| 4,926,423 | 5/1990 | Zukowski | 370/112 |
| 4,977,558 | 12/1990 | Iguchi et al. | 370/112 |

OTHER PUBLICATIONS

H. M. Rein, "Multi-Gigabit-Per-Second Silicon Bipolar IC's For Future Optical-Fiber Transmission Systems", IEEE Journal of Solid-State Circuits, vol. 23, No. 3, Jun. 1988, pp. 664-675.

G. Flower, B. Lai, D. Lee, D. Sears and T. Stockwell, "Masterslice II: A Quick Turnaround Prototyping and Production Tool For Gigaherz [sic] IC's", IEEE Bipolar Circuits and Technology Meeting Proceedings, pp. 23-36.

Data Sheet for Sony CXB1114Q 4-Bit Demultiplexer, pp. 5-38-5-41.

N. Yoshikai, S. Kawanishi, M. Suzuki and S. Konaka, "Monolithic Integrated 4:1 Multiplexer and Demultiplexer Operating Up to 4.8 Gbit/s", Electronics Letters, 14th Feb. 1985, vol. 21, No. 4, pp. 149-151.

Primary Examiner—Douglas W. Olms
Assistant Examiner—Wellington Chin

[57] ABSTRACT

A synchronous, interleaved, time-division 1:M demultiplexor uses M equally-spaced phases of a clock signal having a frequency of B/M to latch M incoming serial data bits (where B is the incoming bit rate and M is an integer power of two equal to or greater than four). Following an input stage of parallel synchronous latches, an intermediate stage of parallel synchronous latches is used in which the intermediate latches are clocked with selected phases of the M-phase clock to latch each bit at a time at least 2/B (i.e., two incoming bit periods) after such bit is received from its respective input latch. Following the intermediate stage of parallel synchronous latches, an output stage of parallel synchronous latches is used in which the output latches are clocked with at least one selected phase of the M-phase clock to latch each bit at a time at least 2/B after such bit is received from its respective intermediate latch.

15 Claims, 6 Drawing Sheets

INTERLEAVED TIME-DIVISION DEMULTIPLEXOR

BACKGROUND OF THE INVENTION

1. Field of the Invention

The present invention relates to high speed digital circuits, and in particular, to high speed time-division demultiplexor circuits.

2. Description of the Related Art

Modern data networks in which multiple computers are interconnected for sharing instructions and data, e.g., local area networks ("LANs"), typically operate over a serial data medium. The computers themselves, however, typically process their instructions or data internally in parallel formats. Therefore, to interface to the data network, each computer must use a 1:M demultiplexor to receive data or instructions from the network, where M is the number of parallel bits of instructions or data which must be time-division demultiplexed from a serial bit stream.

Figure 1:
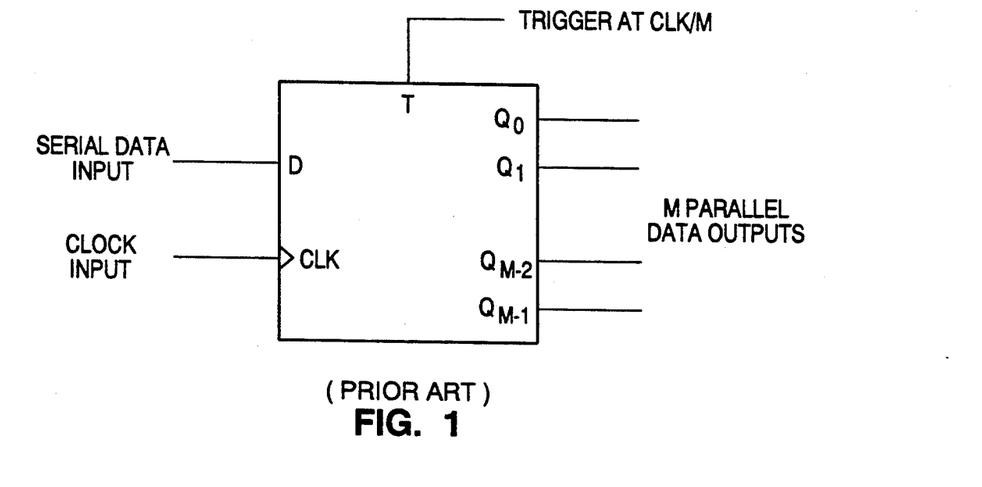
FIG. 1 illustrates a block diagram for a 1:M demultiplexor.

As shown in FIG. 1, a 1:M demultiplexor has a serial data input D, a clock input CLK for clocking the serial data input D into the demultiplexor, M parallel data outputs $Q_0$–$Q_{M-1}$, and a trigger output T. The clock input signal CLK must have a frequency equal to the bit rate of the serial input signal D. The trigger output T has a frequency equal to that of the clock input signal CLK (i.e., the bit rate of the serial input D) divided by the number M of parallel data output bits. Thus, the clock input signal CLK must have a frequency equal to M times the bit rate of the M parallel data outputs $Q_0$–$Q_{M-1}$.

Figure 2:
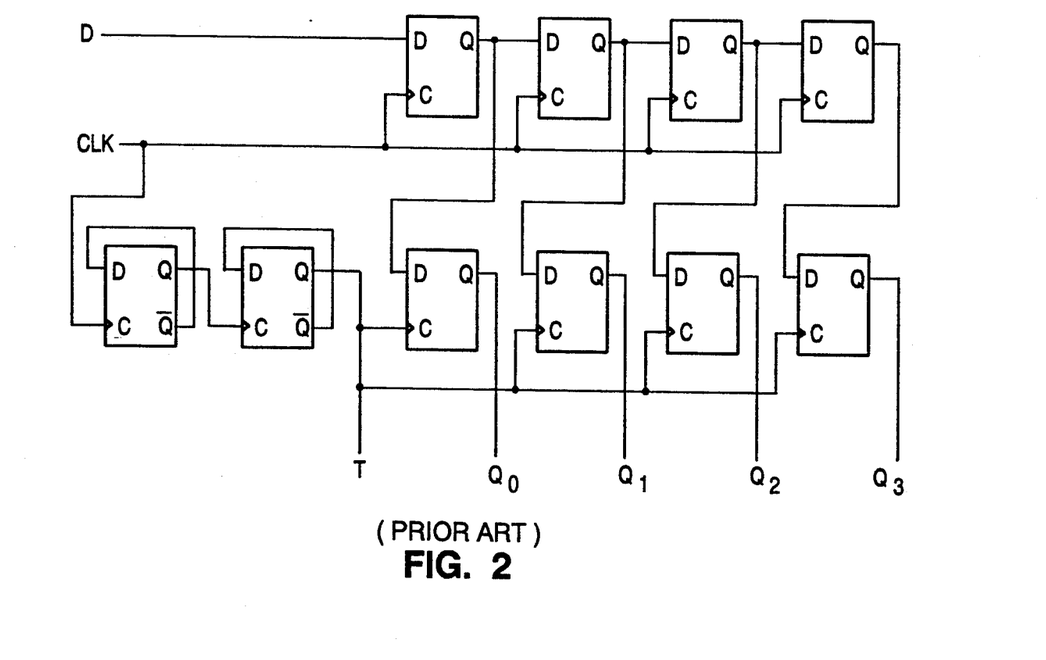
FIG. 2 illustrates a block diagram for a prior art shift registered based, time-division 1:4 demultiplexor.

FIG. 2 illustrates, for the case of M=4 bits, a simple type of time-division demultiplexor based upon an M-bit shift register. The input data D is serially loaded, i.e., shifted in, and on every fourth clock pulse the data is transferred to the output latches. The clock signal CLK, used to clock the D-type flip-flops in the shift register, is also frequency-divided to produce the clock signals for the output flip-flops and the trigger output T.

With a shift register based, time-division demultiplexor as shown in FIG. 2, it will be appreciated that the architectures for the shift register section, the output latches and the frequency divider require the following:

$$T_{bit} > T_{CLK \to Q}$$

where $T_{bit}$ = incoming bit period for serial input D
  = $1/B$ $B$ = incoming bit rate for serial input D $T_{CLK \to Q} \approx 2T_{min}$ $T_{min}$ = qualitative approximation for minimum signal propagation time (e.g., gate delay).

Thus, the maximum bit rate for the demultiplexor architecture of FIG. 2 is determined in accordance with the following:

$$B_{max} < \frac{1}{T_{CLK \to Q}} \approx \frac{1}{2T_{min}}$$

In practice, however, the shift register based, time-division demultiplexor of FIG. 2 cannot achieve this theoretical maximum speed due to the effects of signal delay variations among the various signal paths for the input and output signals. Furthermore, the demultiplexor of FIG. 2 must be operated with a clock signal CLK frequency equal to the incoming serial bit rate. This can be a problem when this type of demultiplexor is used to interface with a very high speed data network medium, such as an optical fiber. Full advantage of the extremely high bit rate capabilities of an optical fiber cannot be realized by simply clocking a solid state electronic demultiplexor at a higher rate. In other words, the electronics simply cannot reliably keep pace with the elevated bit rates possible with optical fibers.

Figure 3:
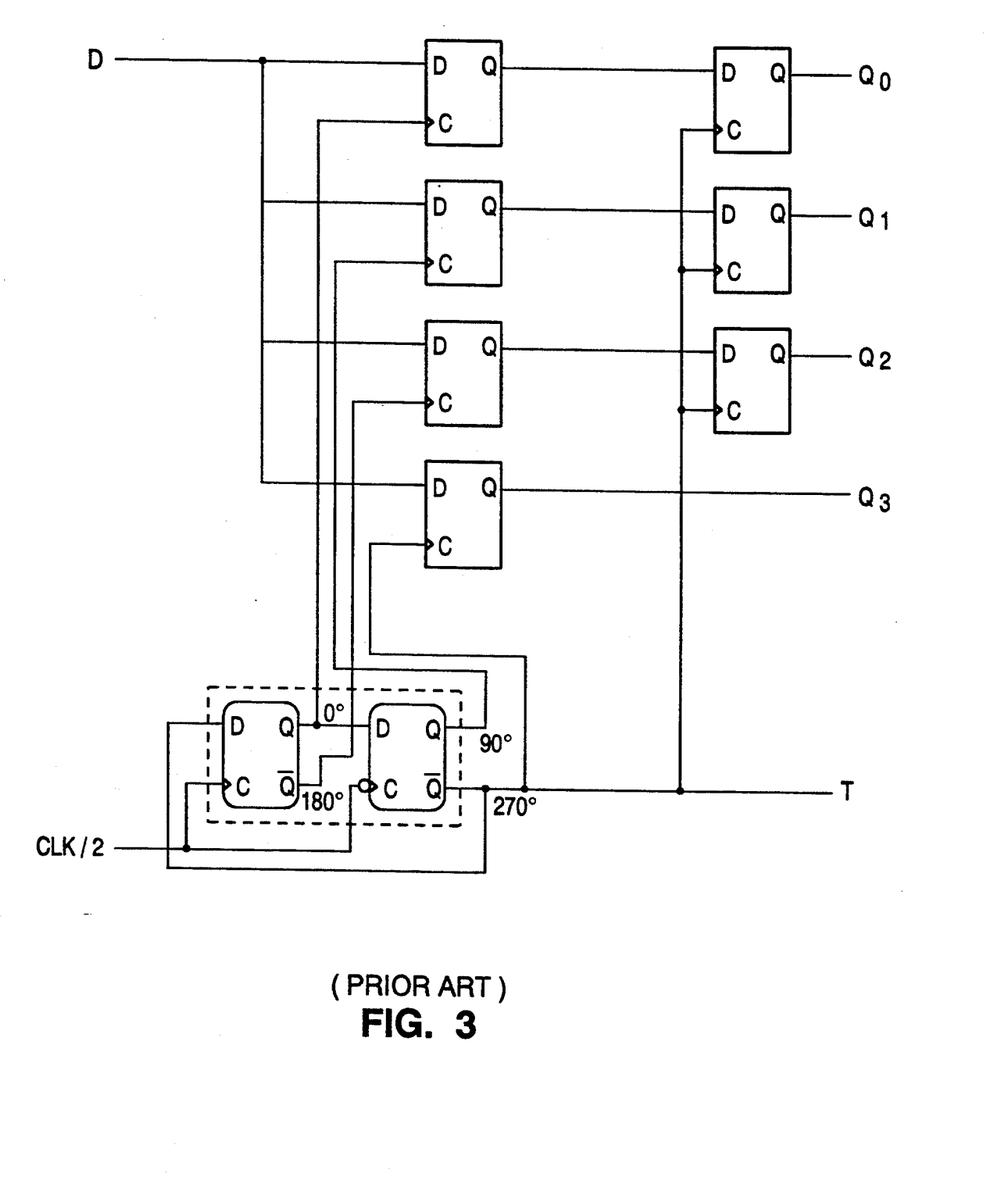
FIG. 3 illustrates a block diagram for a prior art interleaved time-division 1:4 demultiplexor.

In an attempt to increase the architecturally limited maximum bit rate of the demultiplexor of FIG. 2, and to overcome the requirement of using a clock signal CLK having a frequency equal to the incoming serial bit rate, the interleaved, time-division demultiplexor of FIG. 3 was developed. (As in FIG. 2, the illustrated demultiplexor in FIG. 3 is for the case of M=4 bits.) The serial input data D is loaded sequentially into input D-type flip-flops and then transferred as the parallel data outputs $Q_0$–$Q_3$ via output D-type flip-flops (for $Q_0$–$Q_2$) or directly (for $Q_3$). The input flip-flops are clocked with various phases of the frequency-divided, multiphase clock signal, and the output flip-flops are clocked with the same phase of the multiphase clock signal which forms the trigger T output.

The input clock signal CLK/2 for the interleaved demultiplexor of FIG. 3 has a frequency which is half that of the clock signal CLK for the demultiplexor of FIG. 2. It is further frequency-divided with multiple phases by coupling two D-type flip-flops together as a divide-by-two frequency divider circuit.

For the demultiplexor of FIG. 3, it will be appreciated that the input data flip-flops, in conjunction with the clock frequency divider flip-flops, require the following:

$$T_{bit} > T_{CLK \to Q}/2$$

Therefore:

$$B_{max} < \frac{2}{T_{CLK \to Q}} \approx \frac{2}{2T_{min}} = \frac{1}{T_{min}}$$

Within the demultiplexing input stage, each flip-flop requires only that data be valid at its output within one bit period $T_{bit}$. This in theory requires the following:

$$T_{bit} > T_{D,1,2 \to Q}$$

where: $T_{D1,2 \to Q} \approx T_{min}$

Therefore:

$$B_{max} < \frac{1}{T_{D1,2 \to Q}} \approx \frac{1}{T_{min}}$$

Hence, the interleaved time-division demultiplexor of FIG. 3 appears to be faster than the shift register based, time-division demultiplexor of FIG. 2 by a factor of two. However, the interleaved demultiplexor of FIG. 3 with single phase output latches has practical limitations. The use of single stage, single phase output latches requires that each input data bit be latched through its input latch stage within one bit period $T_{bit}$ after the triggering edge of the 180° phase clock signal so that all demultiplexed bits $Q_0$–$Q_3$ can be latched for outputting by the 270° phase clock signal. In other words, this requires the following:

$$T_{bit} > T_{CLK \to Q}$$

Thus, since the overall maximum bit rate cannot exceed the maximum bit rate of the slowest portion of the circuit, the maximum bit rate for the interleaved demultiplexor of FIG. 3 is the following:

$$B_{max} < \frac{1}{T_{CLK \to Q}} \approx \frac{1}{2T_{min}}$$

Thus, the interleaved time-division demultiplexor of FIG. 3 is no faster in theory than the shift register based, time-division demultiplexor of FIG. 2.

Hence, it would be desirable to have a 1:M time-division demultiplexor with an architecture providing a higher maximum bit rate while still requiring a clock signal having a frequency lower than the incoming serial bit rate.

SUMMARY OF THE INVENTION

A synchronous, interleaved, time-division 1:M demultiplexor in accordance with the present invention uses M equally-spaced phases of a multiphase clock signal having a frequency of B/M to begin demultiplexing and to latch M incoming serial data bits (where B is the incoming serial bit rate and M is an integer multiple of two equal to or greater than four). An intermediate stage of parallel latches is clocked with selected phases of the M-phase clock signal to intermediately latch each incoming bit at a time at least 2/B (i.e., two incoming serial bit periods) after such bit is available for latching.

Following the intermediate stage of latches is an output stage of latches, which are further clocked with selective phases of the M-phase clock signal to finally latch each bit at a time at least 2/B (i.e., two incoming serial bit periods) after such bit is available from its respective intermediate latch.

Further in accordance with the present invention, the modular logic topology produces a "building block" demultiplexor design for demultiplexing M serial bits.

These and other objectives, features and advantages of the present invention will be readily understood upon consideration of the following detailed description of the invention and the accompanying drawings.

BRIEF DESCRIPTION OF THE DRAWINGS

Throughout the figures, similar elements are designated with like numerals.

DETAILED DESCRIPTION OF THE INVENTION

Figure 4:
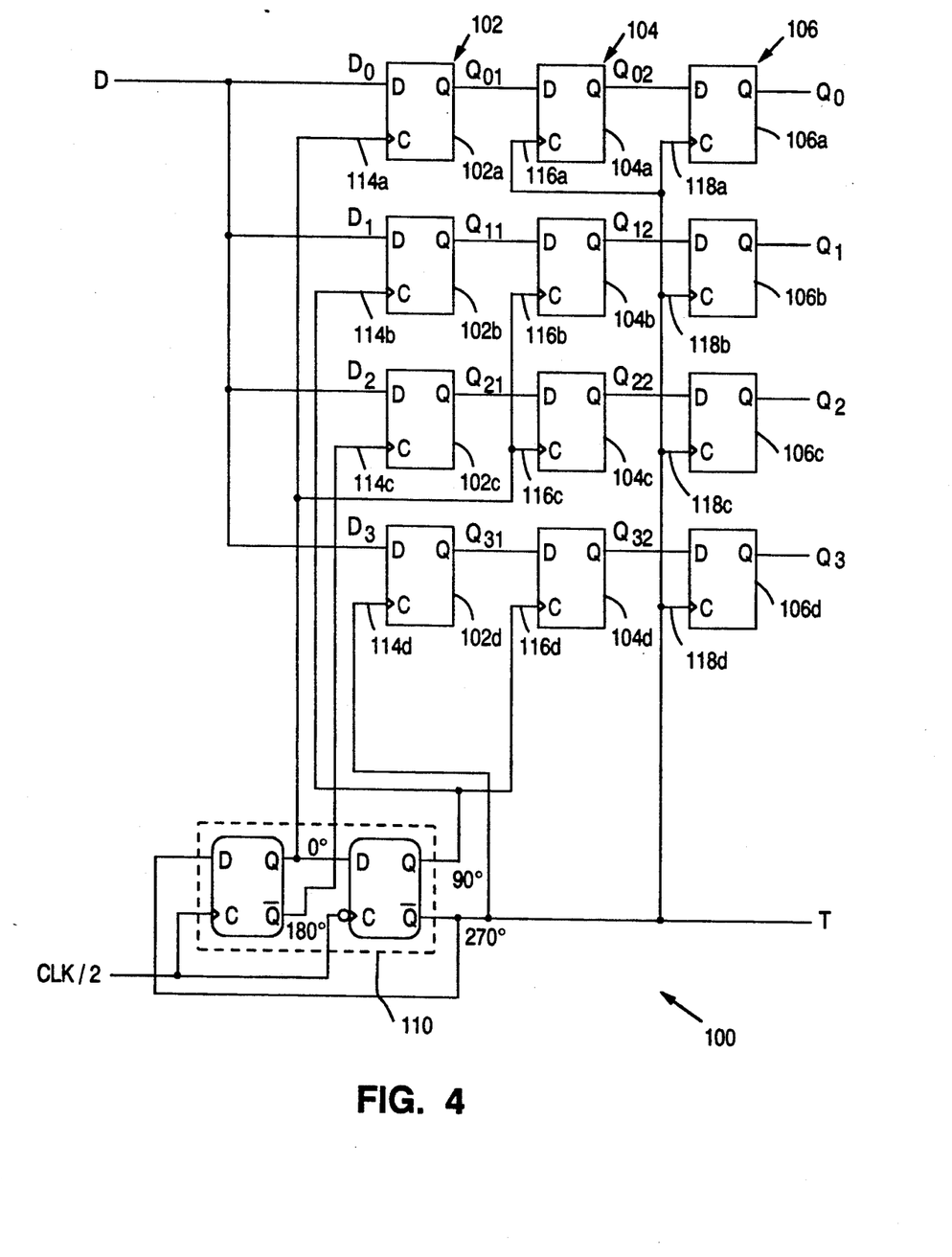
FIG. 4 illustrates a block diagram for a preferred embodiment of an interleaved time-division 1:4 demultiplexor in accordance with the present invention.

Referring to FIG. 4, a synchronous, interleaved, time-division 1:M demultiplexor 100 in accordance with the present invention for the case of M=4 bits consists of: an input stage 102 of latches; an intermediate stage 104 of latches; an output stage 106 of latches; and a multiphase clock signal generator 110.

The multiphase clock signal generator 110 receives a clock signal CLK/2, which has a frequency equal to half that of the bit rate B of the input serial bit stream D. This clock signal CLK/2 is divided by two and provided in phases of 0°, 90°, 180°, 270° as shown in FIG. 4 to the remainder of the demultiplexor 100. The input latches 102 are clocked with the 0°, 90°, 180° and 270° phases. The intermediate latches 104 are clocked with the 0°, 90° and 270° phase signals. The output latches 106 are clocked with the 270° phase signal. As described below and illustrated in the ideal timing diagram (i.e., zero propagation delays) of FIG. 5, the serial input data D is demultiplexed by being successively latched within the input stage 102 and intermediate stage 104 of latches in a phase staggered manner prior to final demultiplexing by the output stage 106 of latches.

Figure 5:
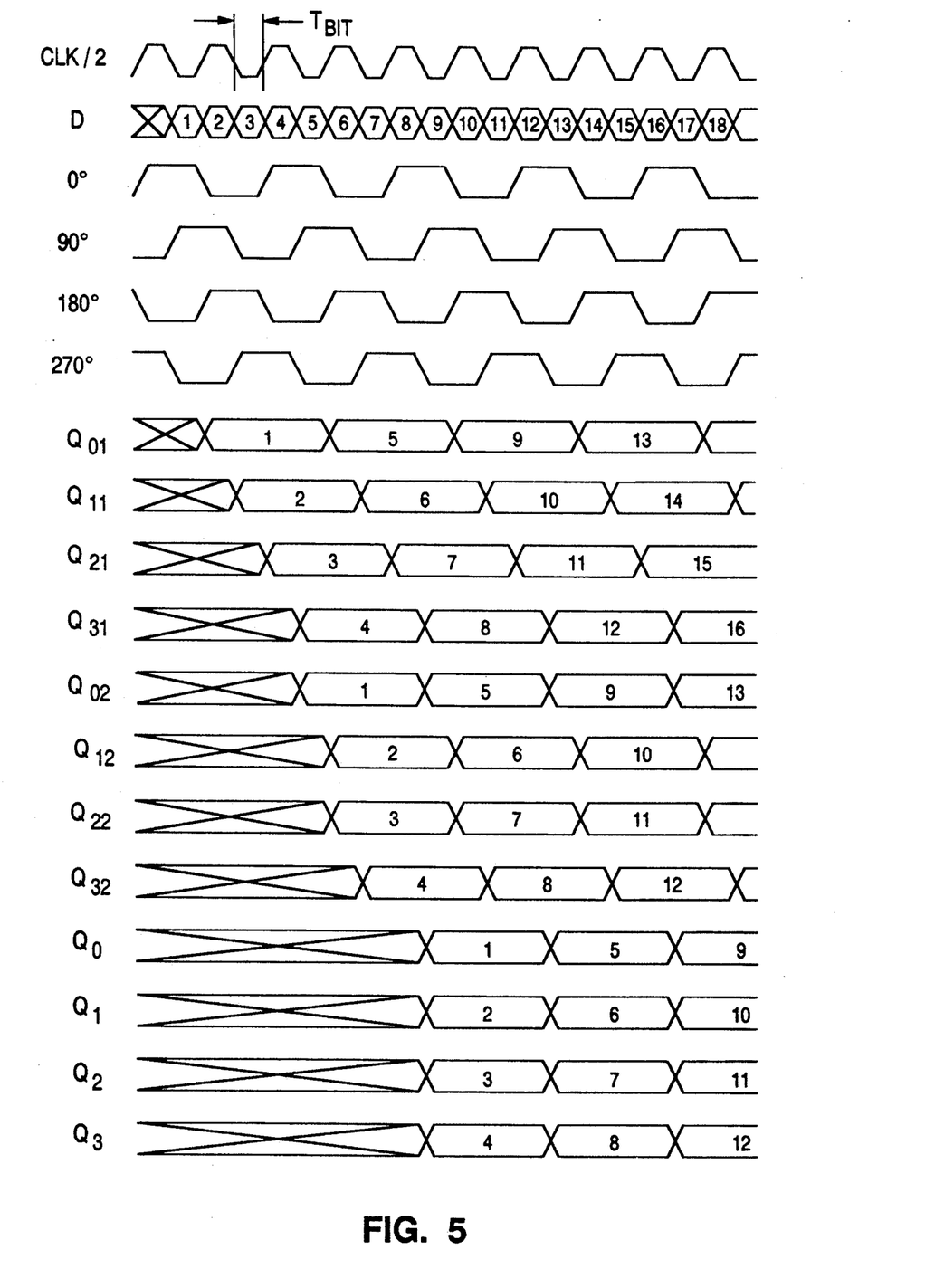
FIG. 5 illustrates an ideal signal timing diagram for the demultiplexor of FIG. 4.

Referring to FIGS. 4 and 5, the serial input data D is loaded sequentially into the input latches 102 on the 0°, 90°, 180° and 270° phase signals, which are generated by the frequency divider circuit 110. As shown in FIG. 4, this frequency divider circuit 110 can consist of cross-coupled, D-type flip-flops connected as a divide-by-two toggle. However, it will be recognized that other types of frequency divider circuit configurations are possible, e.g., using J-K flip-flops, binary counters or shift registers.

The latched parallel data bits $Q_{01}$–$Q_{31}$ are then loaded into the intermediate latches 104 on the 0°, 90° and 270° phase signals. This clock phasing for the intermediate latches 104 provides a minimum of 180 degrees phase margin (i.e., two $T_{bit}$ periods) between the corresponding input 114a–114d and intermediate 116a–116d clock signals latching each respective input data bit $D_0$–$D_3$, $Q_{01}$–$Q_{31}$ in the input 102 and intermediate 104 latches, respectively.

For example, for the least significant bit $D_0$, the phase margin between its corresponding input 114a and intermediate 116a clock signals, i.e., the 0° phase for its input latch 102a and the 270° phase for its intermediate latch 104a, is 270 degrees. Similarly, for the remaining input data bits $D_1$–$D_3$, the phase margins between their corresponding input 114b–114d and intermediate 116b–116d clock signals is at least 180 degrees, thereby providing times equivalent to two incoming serial bit periods, i.e., $2T_{bit}$, for each of the input bits $D_1-D_3$ to become latched input bits $Q_{11}-Q_{31}$.

Thus, the minimum time available, before which each of the input bits $D_0-D_3$ must be valid as one of the latched input bits $Q_{01}-Q_{31}$ for latching by the intermediate latches 104, is equal to two incoming serial bit periods, i.e., $2T_{bit}$. This translates to a maximum incoming serial bit rate $B_{max}$ which can be described by the following:

$$T_{bit} > T_{CLK \to Q}/2$$

Therefore:

$$B_{max} < \frac{2}{T_{CLK \to Q}} \approx \frac{2}{2T_{min}} = \frac{1}{T_{min}}$$

Similarly, the phases for the intermediate clock signals $116a-116d$ for the intermediate latches 104 and the phases for the output clock signals $118a-118d$ for the output latches 106 are selected so that the minimum phase margin between the corresponding clock signals used for latching their respective output data bits $Q_0-Q_3$ in the output latches 106 is 180 degrees. For example, for the least significant latched input bit $Q_{01}$, the phase margin between its intermediate latch clock signal 116a and the output clock signal 118a latching the intermediately latched data bit $Q_{02}$ into its output latch 106a is 360 degrees.

This 180 degrees minimum phase margin results in a time equal to two incoming serial bit period, i.e., $2T_{bit}$, after which the intermediately latched bit $Q_{02}$ must be available for latching by its output latch 106a. This can be described as follows:

$$T_{bit} > T_{CLK \to Q}/2 \approx 2T_{min}/2 = T_{min}$$

Therefore, the maximum bit rate $B_{max}$ due to this timing requirement can be described as follows:

$$B_{max} < 1/T_{min}$$

Thus, the ideal maximum bit rate $B_{max}$ for an interleaved demultiplexor in accordance with the present invention, as illustrated in FIG. 4, exceeds that of a conventional interleaved demultiplexor, as illustrated in FIG. 3, by 100 percent.

Figure 6:
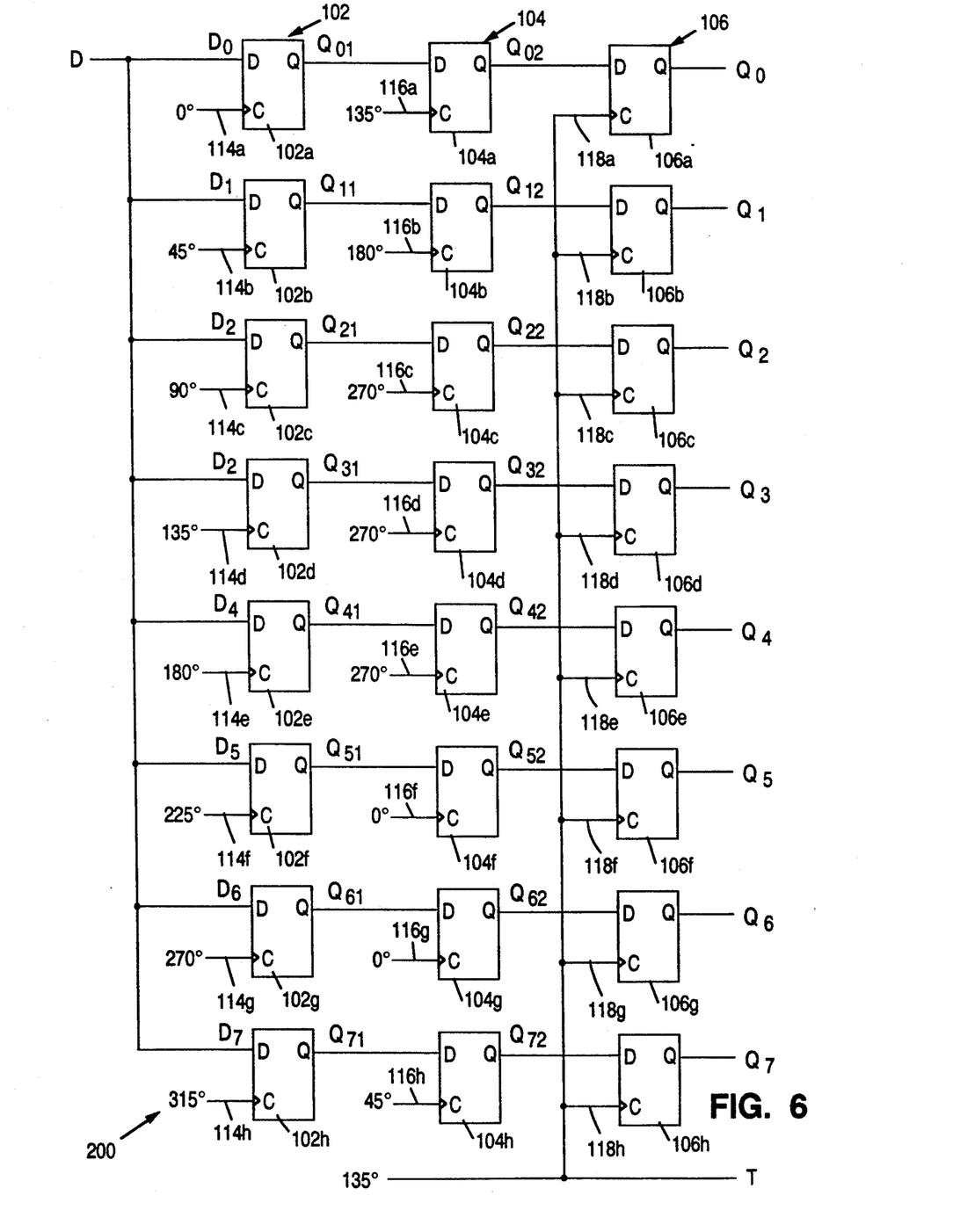
FIG. 6 illustrates a block diagram for a preferred embodiment of an interleaved time-division 1:8 multiplexor in accordance with the present invention.

Referring to FIG. 6, a synchronous, interleaved, time-division 1:M demultiplexor 200 in accordance with the present invention for the case of M=8 bits, similar to the 1:4 demultiplexor of FIG. 4, consists of input 102, intermediate 104 and output 106 stages of latches.

Figure 7:
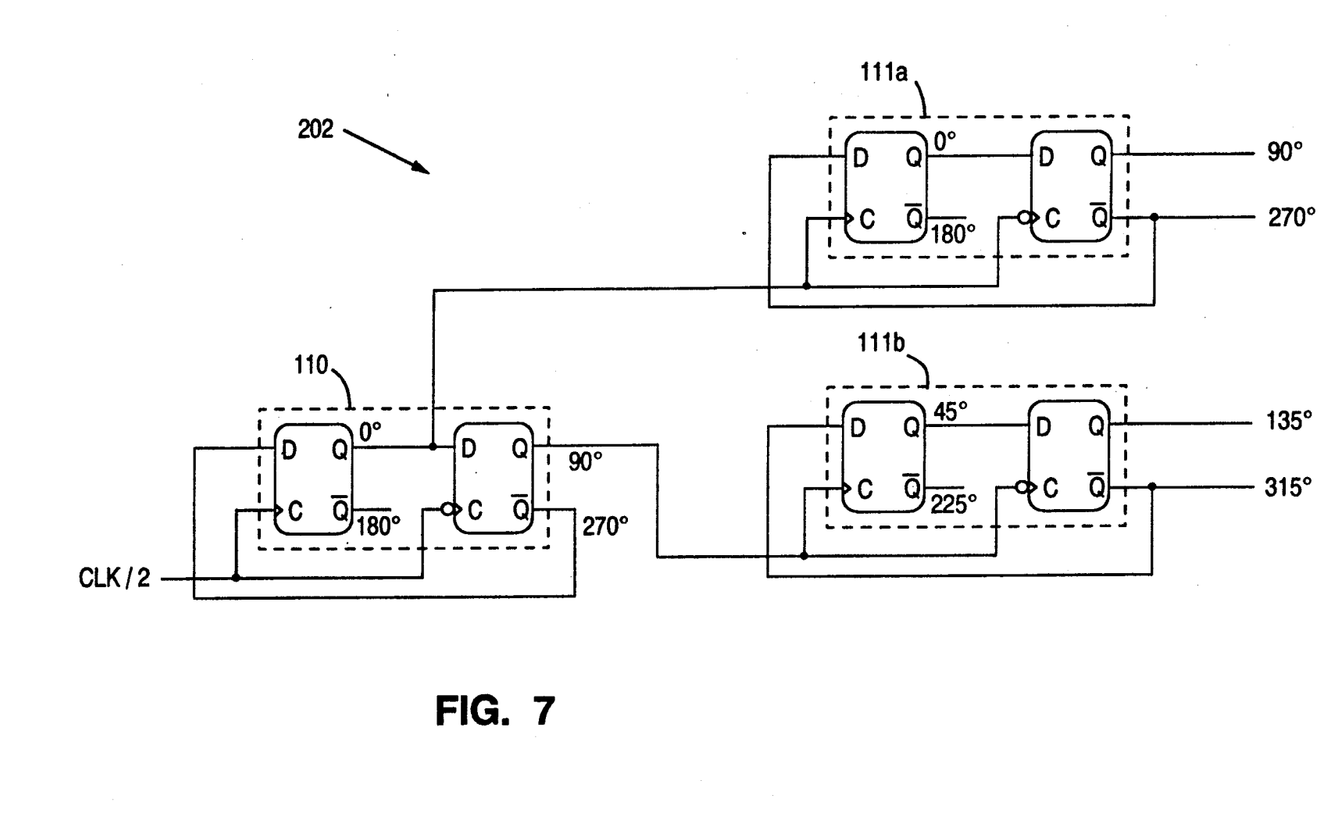
FIG. 7 illustrates a block diagram for an exemplary multiphase clock signal generator for the demultiplexor of FIG. 6.

Similar to the demultiplexor 100 of FIG. 4, the incoming serial input data D is clocked sequentially into the input latches 102 with M phases of a multiphase clock. In the case of M=8 bits, the multiphase clock has eight equidistant phases 0°, 45°, 90°, 135°, 180°, 225°, 270°, 315°. As an extension to the multiphase clock signal generator 110 of FIG. 4, an eight-phase clock signal generator 202, illustrated in FIG. 7 can be constructed using two additional pairs $111a$, $111b$ of cross-coupled, D-type flip-flops. However, as will be appreciated, many other means can be used to generate multiple phases of a clock signal, e.g., flip-flops, counters, shift registers, or R-C (resistive-capacitive) phase shifters.

Similar to the discussion above for the interleaved demultiplexors 100, 200 of FIGS. 4 and 6, the phases of the corresponding, respective clock signals $114a-114h$, $116a-116h$, $118a-118d$ for the input 102, intermediate 104 and output 106 latches are selected to provide minimum clock phase margins of 90 degrees, or minimum clock timing margins of $2T_{bit}$ (i.e., two $T_{bit}$ periods). Further similar to the discussion above, this provides minimum time availabilities, before which the respective input $D_0-D_7$ or latched $Q_{01}-Q_{71}$, $Q_{02}-Q_{72}$ bits must be valid for latching by their respective subsequent latch stages 102, 104, 106, of two incoming serial bit periods, i.e., $2T_{bit}$. As before, this translates to a maximum incoming serial bit rate $B_{max}$ which can be described by the following:

$$T_{bit} > T_{CLK \to Q}/2$$

Therefore:

$$B_{max} < \frac{2}{T_{CLK \to Q}} \approx \frac{2}{2T_{min}} = \frac{1}{T_{min}}$$

Throughout the foregoing discussions of the demultiplexors of FIGS. 1–4 and 6, it has been assumed that the D-type flip-flops are triggered on the falling edges of their clock signals. However, it will be appreciated that other flip-flops, or other types of circuits, can be used which trigger on the rising edges of their clock signals without departing from the spirit and scope of the present invention.

Furthermore, it will be appreciated that other combinations and permutations of phases for the input $114a-114h$, intermediate $116a-116h$ and output $118a-118h$ clock signals can be selected and used which still provide the aforementioned minimum phase margins without departing from the spirit and scope of the present invention.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. A synchronous, interleaved, time-division 1:M demultiplexor for demultiplexing a serial input bit stream having an input bit rate of B into M parallel output bits, comprising:

input latching means for parallelly receiving and latching M serial bits in respective synchronization with a first plurality of selected phases of a multiphase clock signal having a frequency of B/M, wherein each of the first plurality of multiphase clock signal phases is selected to cause the latching of a corresponding bit, wherein M is an integer power of two and equal to or greater than four, and wherein B is a bit rate in bits per second of the received M serial bits;

intermediate latching means for receiving the M latched bits from the input latching means and latching same in respective synchronization with a second plurality of selected phases of the multiphase clock signal, wherein each of the second plurality of multiphase clock signal phases is selected to cause the latching of a corresponding bit to occur substantially at a time at least 2/B after the bit is first received; and output latching means for receiving the M latched bits from the intermediate latching means and latching same in respective synchronization with at least one selected phase of the multiphase clock signal, wherein each phase is selected to cause the latching of a corresponding bit to occur substantially at a time at least 2/B after the bit is first received.

2. A demultiplexor according to claim 1 further comprising multiphase clock generator means for receiving a reference clock signal having a frequency of B and generating the multiphase clock signal.

3. A demultiplexor according to claim 2, wherein the multiphase clock generator means comprises a plurality of D-type flip-flops coupled to receive and frequency-divided the reference clock signal by M.

4. A demultiplexor according to claim 1, wherein the input latching means comprises M D-type flip-flops, wherein each of the flip-flops has a D-input, a clock input and a Q-output, and further wherein each of the D-inputs receives one of the M serial bits, each of the clock inputs receives one of the first plurality of selected multiphase clock signal phases, and each of the Q-outputs provides one of the M latched bits.

5. A demultiplexor according to claim 1, wherein the intermediate latching means comprises M D-type flip-flops, wherein each of the flip-flops has a D-input, a clock input and a Q-output, and further wherein each of the D-inputs receives one of the M latched bits from the input latching means, each of the clock inputs receives one of the second plurality of selected multiphase clock signal phases, and each of the Q-outputs provides one of the M latched bits.

6. A demultiplexor according to claim 1, wherein the output latching means comprises M D-type flip-flops, wherein each of the flip-flops has a D-input, a clock input and a Q-output, and further wherein each of the D-inputs receives one of the M latched bits from the intermediate latching means, each of the clock inputs receives one selected phase of the multiphase clock signal, and each of the Q-outputs provides one of the M latched bits.

7. A bit alignment circuit for receiving M parallel bits having staggered phases and a bit rate of B/M, comprising:
first latching means for receiving M parallel bits having staggered phases and latching same in respective synchronization with a first plurality of selected phases of a multiphase clock signal having a frequency of B/M, wherein each of the first plurality of multiphase clock signal phases is selected to cause the latching of a corresponding bit to occur substantially at a time at least 2/B after the bit is first received, wherein M is an integer power of two and equal to or greater than four, and wherein B is a bit rate in bits per second of the received M parallel bits; and
second latching means for receiving and latching the M latched bits from the first latching means in respective synchronization with at least one selected phase of the multiphase clock signal, wherein each phase is selected to cause the latching of a corresponding bit to occur substantially at a time at least 2/B after the bit is first received.

8. A circuit according to claim 7 further comprising multiphase clock generator means for receiving a reference clock signal having a frequency of B and generating the multiphase clock signal.

9. A circuit according to claim 8, wherein the multiphase clock generator means comprises a plurality of D-type flip-flops coupled to receive and frequency-divide the reference clock signal by M.

10. A circuit according to claim 7, wherein the first latching means comprises M D-type flip-flops, wherein each of the flip-flops has a D-input, a clock input and a Q-output, and further wherein each of the D-inputs receives one of the M parallel bits, each of the clock inputs receives one of the first plurality of selected multiphase clock signal phases, and each of the Q-outputs provides one of the M latched bits.

11. A circuit according to claim 7, wherein the second latching means comprises M D-type flip-flops, wherein each of the flip-flops has a D-input, a clock input and a Q-output, and further wherein each of the D-inputs receives one of the M latched bits from the first latching means, each of the clock inputs receives one selected phase of the multiphase clock signal, and each of the Q-outputs provides one of the M latched bits.

12. A method for synchronously interleaving and time-division 1:M demultiplexing a serial input bit stream having an input bit rate of B into M parallel output bits, comprising the steps of:
parallelly receiving and latching M serial bits in respective synchronization with a first plurality of selected phases of a multiphase clock signal having a frequency of B/M, wherein each of the first plurality of multiphase clock signal phases is selected to cause the latching of a corresponding bit, wherein M is an integer power of two and equal to or greater than four, and wherein B is a bit rate in bits per second of the received M serial bits;
receiving and re-latching the M latched bits in respective synchronization with a second plurality of selected phases of the multiphase clock signal, wherein each of the second plurality of multiphase clock signal phases is selected to cause the latching of a corresponding bit to occur substantially at a time at least 2/B after the bit is first received; and
receiving and re-latching the M re-latched bits in respective synchronization with at least one selected phase of the multiphase clock signal, wherein each phase is selected to cause the latching of a corresponding bit to occur substantially at a time at least 2/B after the bit is first received.

13. A method for bit aligning M parallel bits having staggered phases and a bit rate of B/M, comprising the steps of:
parallelly receiving and latching M parallel bits having staggered phases in respective synchronization with a first plurality of selected phases of a multiphase clock signal having a frequency of B/M, wherein each of the first plurality of multiphase clock signal phases is selected to cause the latching of a corresponding bit to occur substantially at a time at least 2/B after the bit is first received, wherein M is an integer power of two and equal to or greater than four, and wherein B is a bit rate in bits per second of the received M parallel bits; and
receiving and re-latching the M latched bits in respective synchronization with at least one selected phase of the multiphase clock signal, wherein each phase is selected to cause the latching of a corresponding bit to occur substantially at a time at least 2/B after the bit is first received.

14. A bit alignment circuit for receiving M parallel bits having staggered phases and a bit rate of B/M, comprising:

first latching means for receiving M parallel bits having staggered phases and latching same in respective synchronization with a first plurality of selected phases of a multiphase clock signal having a frequency of B/M, wherein each of the first plurality of multiphase clock signal phases is selected to cause the latching of a corresponding bit to occur substantially at a time at least 2/B after the bit is first received, wherein M is an integer power of two and equal to or greater than four, and wherein B is a bit rate in bits per second of the received M parallel bits;

second latching means for receiving and latching the M latched bits from the first latching means in respective synchronization with at least one selected phase of the multiphase clock signal, wherein each phase is selected to cause the latching of a corresponding bit to occur substantially at a time at least 2/B after the bit is first received; and third latching means for parallelly receiving and latching M serial bits having a serial bit rate of B in respective synchronization with a second plurality of selected phases of the multiphase clock signal, and for providing the M parallel bits having staggered phases to the first latching means, wherein each of the second plurality of multiphase clock signal phases is selected to cause the latching of a corresponding bit.

15. A circuit according to claim 14, wherein the third latching means comprises M D-type flip-flops, wherein each of the flip-flops has a D-input, a clock input and a Q-output, and further wherein each of the D-inputs receives one of the M serial bits, each of the clock inputs receives one phase of the second plurality of selected multiphase clock signal phases, and each of the Q-outputs provides one of the M parallel bits having staggered phases.

* * * * *